United States Patent Office 3,318,975
Patented May 9, 1967

3,318,975
MAR-RESISTANT POLYESTERS
William George Deichert, Flushing, N.Y., and Alexander Christian Bristol, Stamford, Conn., assignors to American Cyanamid Company, Stamford, Conn., a corporation of Maine
No Drawing. Filed May 27, 1965, Ser. No. 459,464
15 Claims. (Cl. 260—872)

This invention relates to a novel composition of matter comprising a blend of (A) an unsaturated polyester resin comprising the esterification product of triethylene glycol and fumaric acid, (B) certain glycol diacrylates and (C) allyl methacrylate. Still further, this invention relates to a substantially linear, water-insoluble, non-gelled unsaturated polyester resin composition comprising a blend of the aforesaid polyester resin with allyl methacrylate and various glycol diacrylates. Still further, this invention relates to a hard, mar-resistant cross-linked unsaturated polyester resin prepared from the composition set forth hereinabove. Still further, this invention relates to articles of manufacture comprising a substrate coated with the unsaturated polyester resin composition of the present invention and converted to the hard, mar-resistant, cross-linked state.

One of the objects of the present invention is to produce a composition of matter comprising a blend of (A) an unsaturated polyester resin comprising the esterification reaction product of triethylene glycol and fumaric acid wherein the fumaric acid is substantially the only dicarboxylic acid present, (B) certain glycol diacrylates and (C) allyl methacrylate. A further object of the present invention is to produce a hard, mar-resistant, cross-linked polyester resin product from the aforementioned polyester resin composition. A still further object of the present invention is to produce cast objects from the polyester resin composition of the present invention. A still further object of the present invention is to produce articles of manufacture comprising a base member coated with the aforementioned hard, mar-resistant, cross-linked polyester resin. These and other objects of the present invention will be discussed in greater detail hereinbelow.

The novel composition of matter of the present invention has as its first component (A) the unsaturated polyester resin prepared by reacting triethylene glycol with fumaric acid. These two reactants are essential in producing the hard, mar-resistant surfaces in the ultimate product produced and other seeming equivalent materials, such as other glycols, including ethylene glycol, diethylene glycol, and the like, will not give the results that the triethylene glycol produces. By the same token, the fumaric acid is a necessary component in the polyester resin used in the present invention. Comparable $\alpha,\beta$-ethylenically unsaturated dicarboxylic acids which, for other purposes, may be the full equivalent of fumaric, are far from being comparable for the purposes of the present invention. Acids such as maleic, aconitic, itaconic, chloromaleic, and the like cannot be substituted for the fumaric and still produce the unexpected results which the present polyester resin composition produces. As a consequence, the fumaric acid should be the only dicarboxylic acid present in the polyester resin. It is recognized, however, that comparatively small amounts of other acids can be tolerated, such as trace amounts up to about 5%, by weight, based on the total weight of the acid component, without diminishing significantly the excellent properties achieved in the ultimate products produced from the composition of the present invention. Non-benzenoid unsaturation can also be used in the same minor amounts, namely from about a trace to about 5%. Included in this latter group are such dicarboxylic acids as phthalic, adipic, succinic, and the like.

The triethylene glycol can be used as the sole glycol in the polyester resin used in the present invention and, preferably, no other glycols should be used except in small amounts, such as a trace to about 5%, based on the total weight of glycols. An exception to this provision exists with respect to two glycols only. These glycols are 2-ethyl-1,3-hexanediol and neopentyl glycol, which is otherwise known as 2,2-dimethyl-1,3-propanediol. These two exceptions can be used in amounts varying from about a trace to about 50 mole percent, based on the total number of moles of glycols used.

The amount of the polyester resin used in the composition of matter of the present invention may be varied between about 60%, by weight (solids), and 90%, by weight, based on the total unsaturated polyester resin composition of matter. The remaining amounts of the composition of matter, namely from about 40%, by weight, to about 10%, by weight, is made up of the other critical copolymerizable monomers.

The first critical polymerizable monomer (B) essential to the composition of the present invention is a glycol diacrylate. These compounds are prepared by esterifying an $\alpha,\beta$-ethylenically unsaturated monocarboxylic acid selected from the group consisting of acrylic acid and methacrylic acid with a glycol selected from the group consisting of polyglycols having from 4–8 carbon atoms, inclusive, and monoglycols having from 2–4 carbon atoms, inclusive. Among the polyglycols which may be used to produce the glycol diacrylates are diethylene glycol, triethylene glycol, tetraethylene glycol, dipropylene glycol, bis(4-hydroxybutyl) ether and the like. Among the monoglycols which may be used to esterify the acrylic acids include ethylene glycol, propylene glycol, the propanediols 1,2 and 1,3, the butanediols-1,2, 1,3 and 1,4, etc. These glycol diacrylates may be used with the glycol fumarates either singly or in combination with one another. The total amount of glycol diacrylate, whether used singly or in combination, should be used in amounts varying from about 7% to 37%, by weight, based on the total weight of components (A) and (B).

The second critical polymerizable monomer (C) used in the present invention is allyl methacrylate. This monomer should be present in the compositions of the present invention in amounts varying between 3%, by weight, and 33%, by weight, based on the total weight of the resinous composition (solids).

If desired, a third monomer (D) may be used, namely, glacial methacrylic acid. The use of this monomer is, however, not critical. The amount of glacial methacrylic acid which may be used may be varied between about 0.01% and 5.0%, by weight, based on the total weight of the composition (solids). The addition of the methacrylic acid to the total composition should not upset the balance of the parts, by weight, of the total composition outlined in significant detail hereinabove, and when the glacial methacrylic acid is used, the total percentage, by weight, of components (A), (B), (C) and (D) should be varied between about 10%, by weight, and 40%, by weight, based on the total weight of the composition, as mentioned above.

As has been pointed out hereinabove, the substantially linear, water-insoluble, non-gelled, unsaturated polyester resin composition of matter of the present invention can be converted to a hard, mar-resistant, resinous product. This conversion from the ungelled or thermosetting state to the hard, thermoset state can be accomplished by the application of heat and/or pressure with or without catalysis. Still further, the thermosetting material can be converted to the thermoset state by use of catalysts or initiators without resorting to either heat or pressure. Still further, if desired, a combination of the catalyst, initiator, heat and pressure may be used for certain purposes. The catalytic materials or polymerization initiators which can be used to make such a conversion in state are well-known in the art and have been used extensively for this purpose in collateral compositions. Illustrative catalysts are the peroxide catalysts, such as benzoyl peroxide, tertiary butyl hydroperoxide, ditertiary butyl peroxide, and cumene hydroperoxide, among many others. The ketone peroxides may also be used such as, the methyl ethyl ketone peroxide, the diethyl ketone peroxide, and the like. The amounts of the catalytic material used will be conventional such as between about 0.01% and 10% and more, usually between about 0.1% and 3%, by weight, based on the total weight of the polymerizable composition.

The polymerizable polyester resin compositions of matter of the present invention will have utility in many areas such as in coatings, moldings, castings, and the like. One of the principal end uses for the polymerizable polyester resin compositions of matter of the present invention is in the area of coating mar-suceptible, transparent substrates in order to impart to said substrate a hard, mar-resistant surface. More particularly, the polymerizable polyester resin compositions of matter of the present invention can be used to coat glass for window purposes or for television implosion shields, and the like. Additionally, one can use the polymerizable compositions of the present invention to coat lenses such as those used in eye glasses, sunglasses, binoculars, telescopes, and the like. Still further, these polymerizable compositions of matter may be used to coat sheets of synthetic plastic materials such as sheets of polycarbonates, polyvinyl chloride, polystyrene, poly(vinyl acetate), poly(methyl methacrylate) and the like. If desired, the polyester resin compositions of matter of the present invention may have incorporated therein, ultraviolet light absorbers of which a substantial plurality are well-known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic materials may be incorporated into the compositions of matter of the present invention thereby permitting changes from a colored glass to a clear glass and vice versa, due to the absence or presence of light, including sunlight. If a permanent coloration is desired in the compositions of matter of the present invention, that will not defeat the principal desired end use, namely, transparency, certain dyes and/or pigments may be dissolved in the unsaturated polymerizable polyester resin in order to achieve a tinting. Furthermore, the polyester resin compositions of matter of the present invention can be rendered translucent or even opaque by use of an appropriate filler and/or pigment of the desired kind and amount, especially when being used as a coating for substrates such as wood, metal, opaque, filled plastic articles and the like.

The following examples are set forth for purposes of illustration only and are not to be construed as limitations on the present invention except as set forth in the appended claims. All parts and percentages are by weight unless otherwise specified.

POLYESTER RESIN "A"

Into a suitable reaction vessel equipped with thermometer, stirrer and inert gas inlet and outlet tubes, is introduced 126 parts of triethylene glycol and 93 parts of fumaric acid. The charge is heated at about 150–200° C. for a twenty-four hour period, while bubbling carbon dioxide gas through the reaction mixture so as to provide an inert atmosphere. At the end of the reaction period a light yellow, viscous, liquid product having an acid number of 17 is recovered.

*Example 1*

Into a suitable mixing vessel, there is introduced 300 parts of Resin "A," 70 parts of ethylene glycol dimethacrylate, 30 parts of allyl methacrylate, and 0.1 part of glacial methacrylic acid. After thoroughly blending the materials together, they are catalyzed by the addition of 8 parts of benzoyl peroxide. The catalyzed composition is then poured into a casting shell and is heated for sixteen hours at 60° C. followed by 90 minutes at 100° C. After the one hour of heating at 100° C., the casting is then heated gradually to 135° C. prior to the removal from the oven. The cast sheet is removed from the oven, cooled to room temperature and then subjected to a series of tests. The results of these tests are set forth in Table I, hereinbelow.

Following the procedure of Example 1, various mixtures of several glycol diacrylates, fumaric acid, triethylene glycol, allyl methacrylate, 2-ethyl-1,3-hexanediol, and neopentyl glycol, in varying concentrations, are formed and tested for mar-resistance. The results are set forth in Table I, below.

In Example 6, the composition of matter formed according to the instant invention was poured, in an uncured state, onto a sheet of plate glass to form a film. Over the film was carefully placed a sheet of poly(methyl methacrylate). A second glass plate was then placed over the plastic sheet and the total assembly was clamped together and heated for 30 minutes at 80° C., 30 minutes at 100° C., 1 hour at 120° C. and 30 minutes at 130° C. The assembly was cooled and the glass sheets were separated from the resultant coated poly(methyl methacrylate).

We claim:

1. A composition of matter consisting essentially of a blend of (A) an unsaturated polyester resin consisting essentially of the esterification product of triethylene glycol and fumaric acid, (B) a glycol diacrylate which is the re-

TABLE I

| Ex. | Component A | Percent | Component B | Percent | Allyl Methacrylate, percent | Glacial Methacrylic Acid, percent | Initial Haze, percent | Percent Haze Taber Test | | Refractive Index at 25° C. |
|---|---|---|---|---|---|---|---|---|---|---|
| | | | | | | | | 100 Rev. | 200 Rev. | |
| 1 | 126 parts TEG and 93 parts FA. | 75 | EGDM | 17.5 | 7.5 | 0.1 | 1.2 | 6.7 | 16.8 | 1.5160 |
| 2 | ----do [1] | 60 | PEGDM | 20 | 20 | | 1.0 | 8.8 | 22.9 | 1.5174 |
| 3 | ----do | 80 | PEGDM | 10 | 10 | | 1.6 | 5.7 | 16.1 | 1.5149 |
| 4 (comp.) | ----do | 80 | PEGDM | 20 | | | 1.3 | 7.3 | 17.5 | 1.5115 |
| 5 | ----do [2] | 70 | EGDM | 15 | 15 | | 1.3 | 8.0 | 18.2 | 1.5175 |
| 6 | ----do [3] | 60 | EGDM | 20 | 20 | | 1.6 | 10.7 | 24.0 | 1.5182 |
| 7 | ----do | 80 | EGDM | 10 | 10 | | 1.6 | 7.7 | 17.0 | 1.5168 |
| 8 (comp.) | ----do | 80 | EGDM | 20 | | | 1.3 | 7.3 | 16.9 | 1.5165 |
| 9 (comp.) | ----do | 80 | | | 20 | | 1.3 | 6.8 | 18.1 | 1.5174 |

TEG=Triethylene glycol.
FA=Fumaric acid.
EGDM=Ethyleneglycol dimethacrylate.
PEGDM=Polyethyleneglycol dimethacrylate.
[1] 2-ethyl-1,3-hexanediol-triethyleneglycol (63/63) used as alcohol component.
[2] Neopentyl glycol-triethyleneglycol (63/63) used as alcohol component.
[3] See description preceding Table I.
Comp.=Comparative.

action product of a glycol selected from the group consisting of polyglycols having from 4–8 carbons atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on the total weight of (A), (B) and (C).

2. A composition of matter consisting essentially of a blend of (A) an unsaturated polyester resin consisting essentially of the esterification reaction product of triethylene glycol, 2-ethyl-1,3-hexanediol and fumaric acid, (B) a glycol diacrylate which is the reaction product of a glycol selected from the group consisting of polyglycols having from 4–8 carbon atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on the total weight of (A), (B) and (C).

3. A composition of matter consisting essentially of a blend of (A) an unsaturated polyester resin consisting essentially of the esterification reaction product of triethylene glycol, neopentyl glycol and fumaric acid, (B) a glycol diacrylate which is the reaction product of a glycol selected from the group consisting of polyglycols having from 4–8 carbon atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on the total weight of (A), (B) and (C).

4. A hard, mar-resistant, cross-linked, unsaturated polyester resin composition consisting essentially of the cured reaction product of (A) an unsaturated polyester resin consisting essentially of the esterification product of triethylene glycol and fumaric acid, (B) a glycol diacrylate which is the reaction product of a glycol selected from the group consisting of polyglycols having from 4–8 carbon atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on the total weight of (A), (B) and (C).

5. A hard, mar-resistant, cross-linked, unsaturated polyester resin composition consisting essentially of the cured reaction product of (A) an unsaturated polyester resin consisting essentially of the esterification reaction product of triethylene glycol, 2-ethyl-1,3-hexanediol and fumaric acid, (B) a glycol diacrylate which is the reaction product of a glycol selected from the group consisting of polyglycols having from 4–8 carbon atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on the total weight of (A), (B) and (C).

6. A hard, mar-resistant, cross-linked, unsaturated polyester resin composition consisting essentially of the cured reaction product of (A) an unsaturated polyester resin consisting essentially of the esterification reaction product of triethylene glycol, neopentyl glycol and fumaric acid, (B) a glycol diacrylate which is the reaction product of a glycol selected from the group consisting of polyglycols having from 4–8 carbon atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on the total weight of (A), (B) and (C).

7. A sheet of poly(methyl methacrylate) having bonded thereto a hard, mar-resistant, cross-linked, unsaturated polyester resin composition consisting esssentially of the cured reaction product of (A) an unsaturated polyester resin consisting essentially of the esterification product of triethylene glycol and fumaric acid, (B) a glycol diacrylate which is the reaction product of a glycol selected from the group consisting of polyglycols having from 4–8 carbon atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on tthe total weight of (A), (B) and (C).

8. A sheet of poly(methyl methacrylate) having bonded thereto a hard, mar-resistant, cross-linked, unsaturated polyester resin composition consisting essentially of the cured reaction product of (A) an unsaturated polyester resin consisting essentially of the esterification reaction product of triethylene glycol, 2-ethyl-1,3-hexanediol and fumaric acid, (B) a glycol diacrylate which is the reaction product of a glycol selected from the group consisting of polyglycols having from 4–8 carbon atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on the total weight of (A), (B) and (C).

9. A sheet of poly(methyl methacrylate) having bonded thereto a hard, mar-resistant, cross-linked, unsaturated polyester resin composition consisting essentially of the cured reaction product of (A) an unsaturated polyester resin consisting essentially of the esterification reaction product of triethylene glycol, neopentyl glycol and fumaric acid, (B) a glycol diacrylate which is the reaction product of a glycol selected from the group consisting of polyglycols having from 4–8 carbon atoms, inclusive, and monoglycols having from 2–4 carbon atoms, inclusive, and an acid selected from the group consisting of acrylic acid and methacrylic acid and (C) allyl methacrylate, wherein (B) is present in amounts ranging from about 7% to 37%, by weight, based on the total weight of components (A) and (B), and (C) is present in amounts ranging from about 3% to 33%, by weight, based on the total weight of (A), (B) and (C).

10. A composition according to claim 1 wherein said glycol diacrylate is polyethylene glycol dimethacrylate.

11. A composition according to claim 1 wherein said glycol diacrylate is ethylene glycol diacrylate.

12. A composition according to claim 4 wherein said glycol diacrylate is polyethylene glycol dimethacrylate.

13. A composition according to claim 4 wherein said glycol diacrylate is ethylene glycol diacrylate.

14. A sheet according to claim 7 wherein said glycol diacrylate is polyethylene glycol dimethacrylate.

15. A sheet according to claim 7 wherein said glycol diacrylate is ethylene glycol diacrylate.

(References on following page)

References Cited by the Examiner

UNITED STATES PATENTS 3,079,368  2/1963  Lundberg _____ 260—868
3,222,421  12/1965  Lundberg _____ 260—872

OTHER REFERENCES

Sias C. B.: Abrasion and Wear Resistance of Reinforced Polyester Surfaces, Plastics Technology, vol. 7, pp. 39–48 and 56 (1961).

Schildknecht: Vinyl & Related Polymers, pp. 208–211.

SAMUEL H. BLECH, *Primary Examiner.*

MARY TILLMAN, *Examiner.*

J. T. GOOLKASIAN, *Assistant Examiner.*